United States Patent [19]

Shields

[11] Patent Number: 4,665,786

[45] Date of Patent: * May 19, 1987

[54] LOG HANDLING AND SAWING SYSTEM

[76] Inventor: Dean W. Shields, P.O. Box 129, Jasper, Ga. 30143

[*] Notice: The portion of the term of this patent subsequent to May 7, 2002 has been disclaimed.

[21] Appl. No.: 728,581

[22] Filed: Apr. 29, 1985

Related U.S. Application Data

[62] Division of Ser. No. 461,852, Jan. 28, 1983, Pat. No. 4,515,196.

[51] Int. Cl.⁴ ............ B27B 15/00; B27B 31/04
[52] U.S. Cl. ........................... 83/364; 83/367; 83/411 R; 83/801
[58] Field of Search ............ 83/364, 365, 367, 411 R, 83/733, 801, 71; 144/376, 377, 378

[56] References Cited

U.S. PATENT DOCUMENTS 4,139,035 2/1979 Bystedt .................. 83/71 X
4,262,572 4/1981 Flodin .................... 144/378

Primary Examiner—James M. Meister
Attorney, Agent, or Firm—C. A. Phillips

[57] ABSTRACT

A sawmill in which a multi-log supporting mechanism is constructed wherein logs are grasped at spaced angular positions about the mechanism and rotated by it between an initial receiving position to a profile measurement position and then to a sawing position. The end-to-end axis of the supporting mechanism is adjustably oriented with respect to a saw in terms of profile measurements and size of lumber determined to be cut from a log. Directionally, this adjustment is made normal to the profile measurement dimension.

6 Claims, 24 Drawing Figures

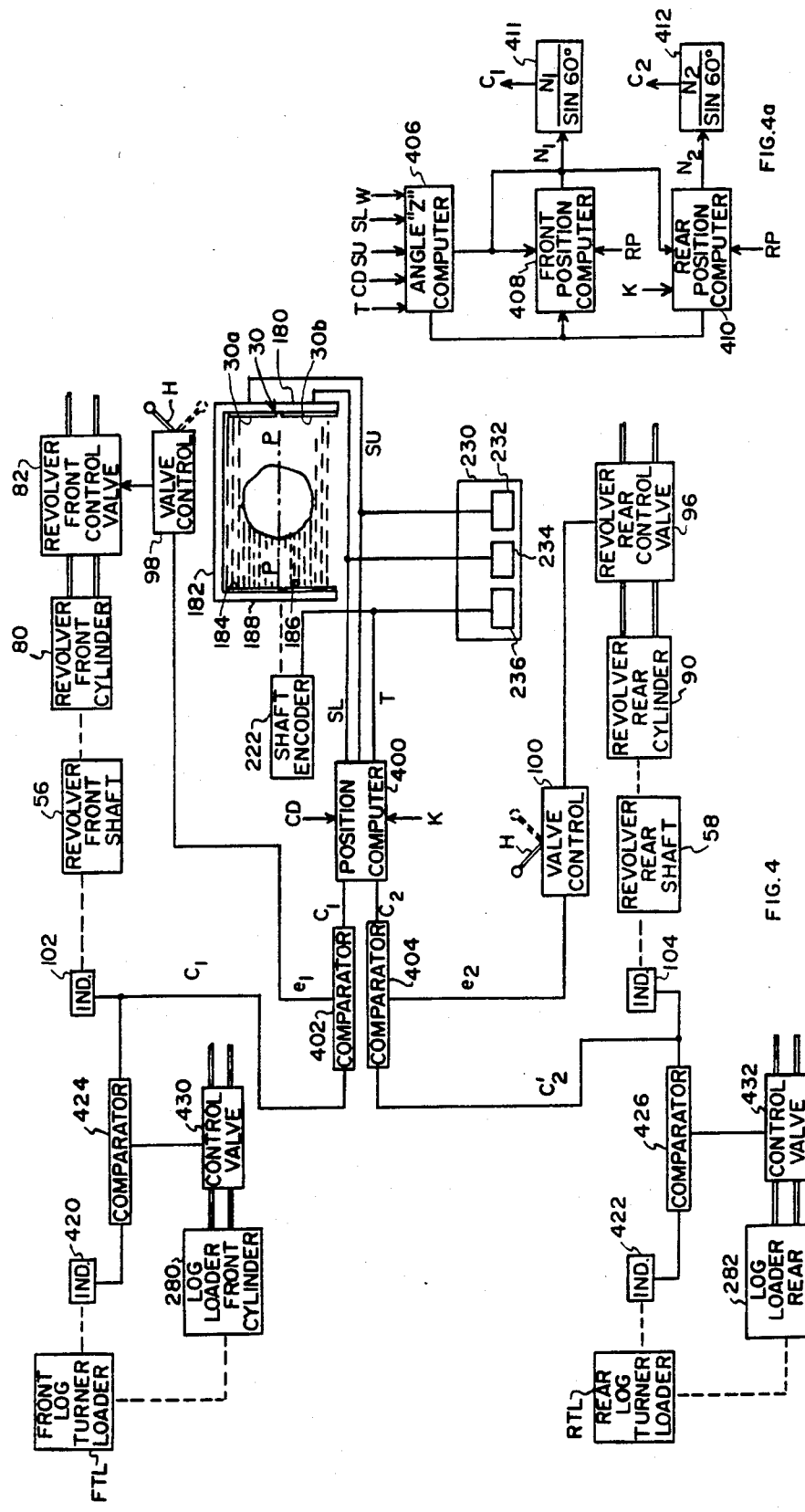

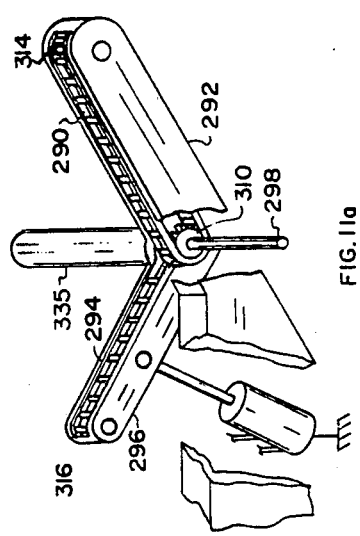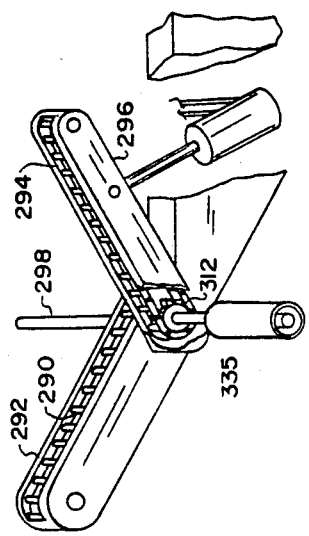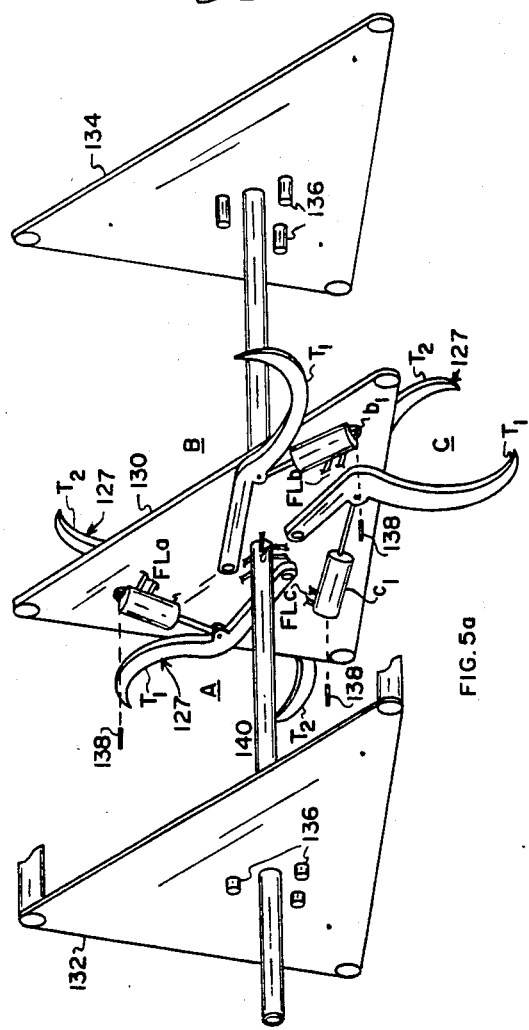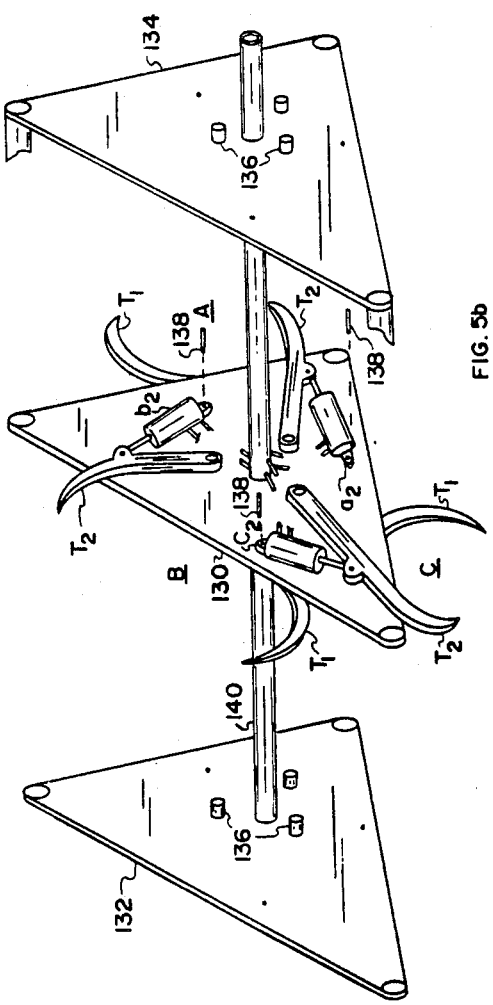

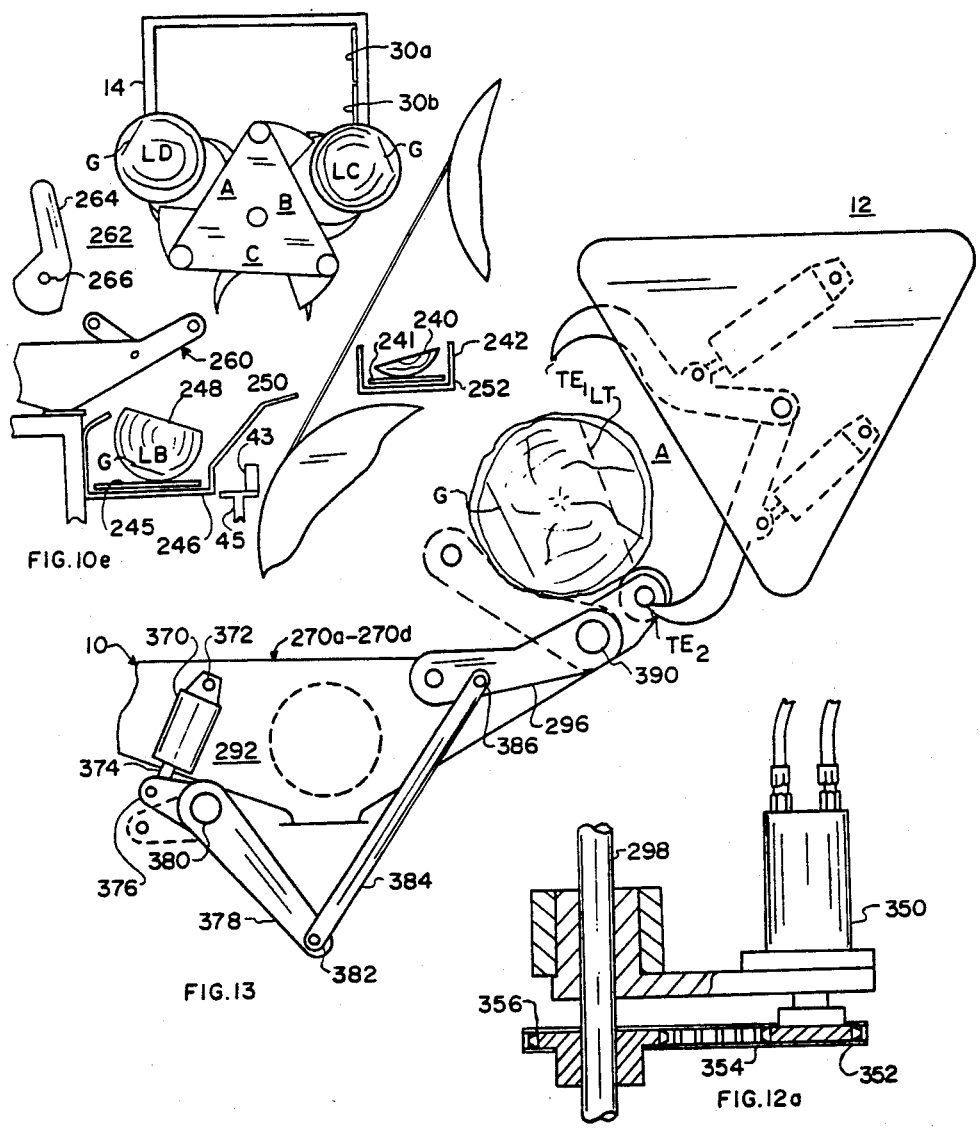
FIG.10e
FIG.13
FIG.12a
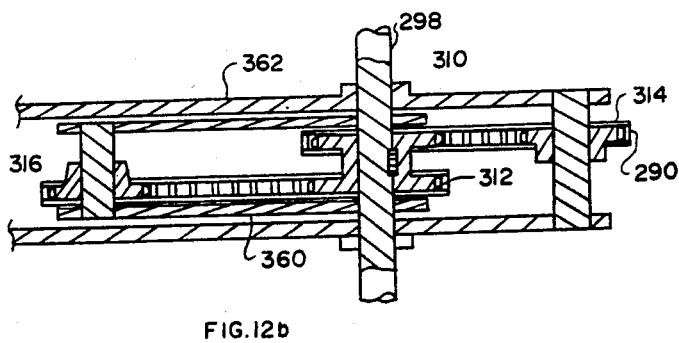
FIG.12b

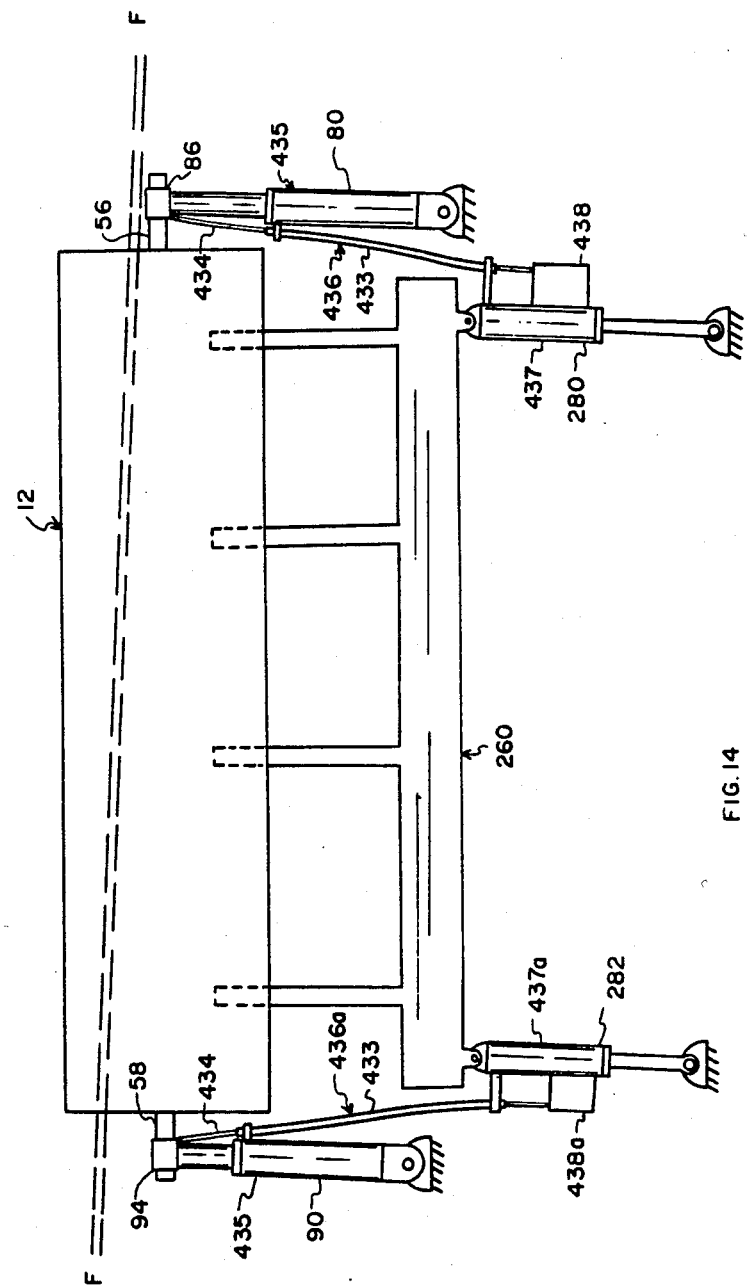

LOG HANDLING AND SAWING SYSTEM

This is a division of application Ser. No. 461,852 entitled "Log Handling and Sawing System," filed Jan. 28, 1983, now U.S. Pat. No. 4,515,146.

TECHNICAL FIELD

This invention relates generally to sawmill systems, and particularly to an improved system for opening a log, that is, effecting the initial face cut on a log being sawn for lumber.

BACKGROUND OF THE INVENTION

As is well known, a number of sawing systems are used to produce boards from logs, including systems which provide for opening a log. The latter are referred to as being of a primary breakdown type. Most primary breakdown sawing systems have available various devices for automatically (e.g., electronically) measuring each log and for using these measurements to increase the rate at which logs are processed through the system--throughput, and/or for improving the value of lumber to be recovered from each log.

In order to achieve a high volume of lumber production, it is often desirable to first run each log through a primary breakdown saw to make a first planar cut, and after this is accomplished, to pass the resulting piece or pieces (slabs, cants, or flitches) through one or more resawing operations, the resawing operation being performed by the same or a separate saw. The resawing operation reduces larger pieces into common board thicknesses (e.g., four, eight inches, etc.); then, from the resawing operation, the resulting boards are passed through edgers (for width) and trimmers (for length) to achieve final board widths and lengths.

There are numerous choices available for sawing a log into lumber, and some are clearly better than others. Each log has unique geometry as to, for example, sweep, taper, notch (defects), length, and diameter. The amount of lumber recovered from a log is significantly effected by how these features are oriented to the plane of the primary breakdown saw cut. Thus, for maximum lumber recovery, there must be an initial determination of this plane before the cutting of it in order that the best opening planar cut in the log be made. In the trade, the term "best opening face" is employed to describe this cut. Once that opening face cut is made, the number of choices for sawing the remainder of the log are greatly limited, especially for small diameter logs. Thus, a slight error between an ideal opening face cut and an actual cut (e.g., resulting in an error on the order of $\pm\frac{1}{8}$ to $\pm\frac{1}{4}$ inch), may significantly reduce the amount of lumber yield from a log, particularly in the case of logs eight inches or smaller in diameter. It is to be appreciated that in order to determine a "best opening face," the log must first be measured, and with measurements, the log be analyzed, and thereafter, the position of a saw with respect to the log be set.

It is acknowledged that a variety of different sawing systems are presently used to produce boards from logs, including systems which provide for a separate opening of a log, as previously described. One well known primary cut system is referred to as a Head Rig and Carriage System. While refined to an extent over the years, the basic design of the Head Rig and Carriage System has been in use for the past 100 years. It employs a stationary band or circular saw with a track laid out parallel to this saw (Head Rig). The Carriage of this system is moved back and forth on these tracks past the Head Rig, with the Carriage having movable upright structures which move in generally horizontal guide ways, referred to as head-blocks. Logs are individually rolled onto the Carriage and are held against head-block knees by pointed clamps called dogs. A Carriage-borne log is positioned by using the head-blocks; the Carriage and log are then moved past the saw in successive passes to cut an initial face and then cut the log into acceptable board thicknesses. Electro-optical sensors may be used to measure the log after it has been dogged to the Carriage, and these measurements are then used to more intelligently position the log for cutting.

The Head Rig and Carriage System can cut accurately-sized lumber and can be designed to recover a high percentage of lumber from each log. The throughput of this type system is quite low, on the order of one to three logs per minute.

A second pertinent system is known as a Sharp Chain Primary Breakdown Saw. It employs a precision-guided chain having upwardly pointed teeth, with the chain being routed between a pair of vertical saws and/or chipper heads. Logs are placed on the Chain and conveyed through and past the saws or chipper heads. Sides of a log are removed by the saws (or chipper heads), leaving a center cant or two-sided log mounted to the Sharp Chain. The diameter of a log may be measured as the log is conveyed toward the saws, and these saws are moved toward or away from the Chain track in accordance with the measurements taken.

Since logs can be positioned on the Sharp Chain while the log is being sawn, the Sharp Chain System has a higher throughput, on the order of eight to ten logs per minute. However, this system provides a lower lumber recovery per log than the Head and Carriage System since a log cannot be repositioned once it is placed on the Sharp Chain. This means that if a log is initially improperly positioned, it will end up being improperly sawn. Since much of the scanning or log measurement with this type system is done after the log is placed on the track, the probability of improper placement and cutting and lumber waste is considerable.

The Sharp Chain System is more economical, and thus most competitive, when used to cut smaller and more uniform logs, such as are produced in northern forests, e.g., Scandanavia and Canada, while the Head Rig and Carriage System is best suited for larger diameter logs, decreasingly available in number from the Pacific Northwest.

Significantly, the lumber potential of the U.S. southeast is very substantial in both the short- and long-term future as this region contains an abundance of fast-growing, marketable pine timber. On the other hand, southern sawmilling has to date been generally inefficient and wasteful, with the waste wood simply being converted into chips for the paper industry. One reason for this has been that, in contrast to logs from the other regions mentioned, southern pine logs are generally irregular, with considerable sweep, taper, and diameter and length variations, as well as having knots and other defects. These irregularities and the limited volume (for footage) of lumber available in small diameter southern logs create a need for them not only to be individually analyzed before sawing, but also to be sawn accurately in terms of this analysis in order to recover their maximum value. Furthermore, and most importantly, these combined operations must be performed more rapidly than has heretofore been possible if the full potential utilizing southern pine logs for lumber is to be realized.

Accordingly, the object of this invention is to provide a primary breakdown sawing system which will accurately analyze and saw logs at a rapid rate and thus provide for improved economic recovery of lumber from available timber of varying size, large or small, and of varying quality.

SUMMARY OF THE INVENTION

A log to be sawn is first grasped and rotationally oriented in accordance with the angle of a selected reference line parallel with a desired plane for a first cut through the log. Then, in accordance with this invention, a revolving mechanism would grab the log and firmly hold it at its initial angle of orientation with respect to the axis of the revolving mechanism. Next, the log is revolved about the axis of the revolving mechanism to or through a log shape detection position where the shape of the log is detected or measured by measurements taken normal to a second plane through the reference line, for example, this being a plane of machine engagement with the log. As an example of a measurement, measurement would be effected by an optical scanner, scanning along lines parallel with the second plane. This means of scanning would produce a profile of the log from which its true shape may be mathematically approximated. After scanning for measurement, the log would be further revolved, this time to a sawing position, and a new distance and alignment of the revolving mechanism with respect to a plane of sawing would be effected in accordance with the scanning measurements and lumber selected to be cut from the log. Significantly, this adjustment is made along a plane normal to the direction of profile measurement, or parallel with planar lines of scanning. This in turn enables the adjustment to be made for the sawing of one log at the same time that the next or second and rotationally following log to be sawn is being profiled detected. Finally, and most importantly, the processes of log measurement, machine adjustment, and sawing are completely non-interfering, and the accuracies of each are precisely maintained.

BRIEF DESCRIPTION OF THE DRAWINGS

FIG. 4 is an electrical block diagram of an embodiment of a control system as contemplated by this invention.

FIG. 4a is an electrical block diagram indicating in greater detail a portion of the position computer in FIG. 4.

FIGS. 5a and 5b are exploded pictorial views, as seen from two perspectives, of a subassembly of the system.

FIGS. 10a–10e are schematic illustrations showing stages of operation of the system of the invention.

FIGS. 11a and 11b are pictorial views of certain positioning arms from opposite perspectives illustrating their operation as employed by an embodiment of the invention.

FIG. 12a is essentially a schematic illustration of a drive system for the operation of certain chains employed in the rotation of a log.

FIG. 12b is basically a schematic illustration of the operation of the positioning chains driven by the assembly illustrated in FIG. 12a and representing an alternate structure to that illustrated in FIG. 1.

FIG. 13 is a schematic illustration of a coupling system for the operation of a movable arm employed in the positioning of a log, and including an alternate mode of operation from that shown in FIGS. 11a and 11b.

FIG. 14 is a schematic illustration of an alternate control system for the maintenance of a parallel condition between certain subsystems of this invention.

DETAILED DESCRIPTION OF THE PREFERRED EMBODIMENT

Figure 1:
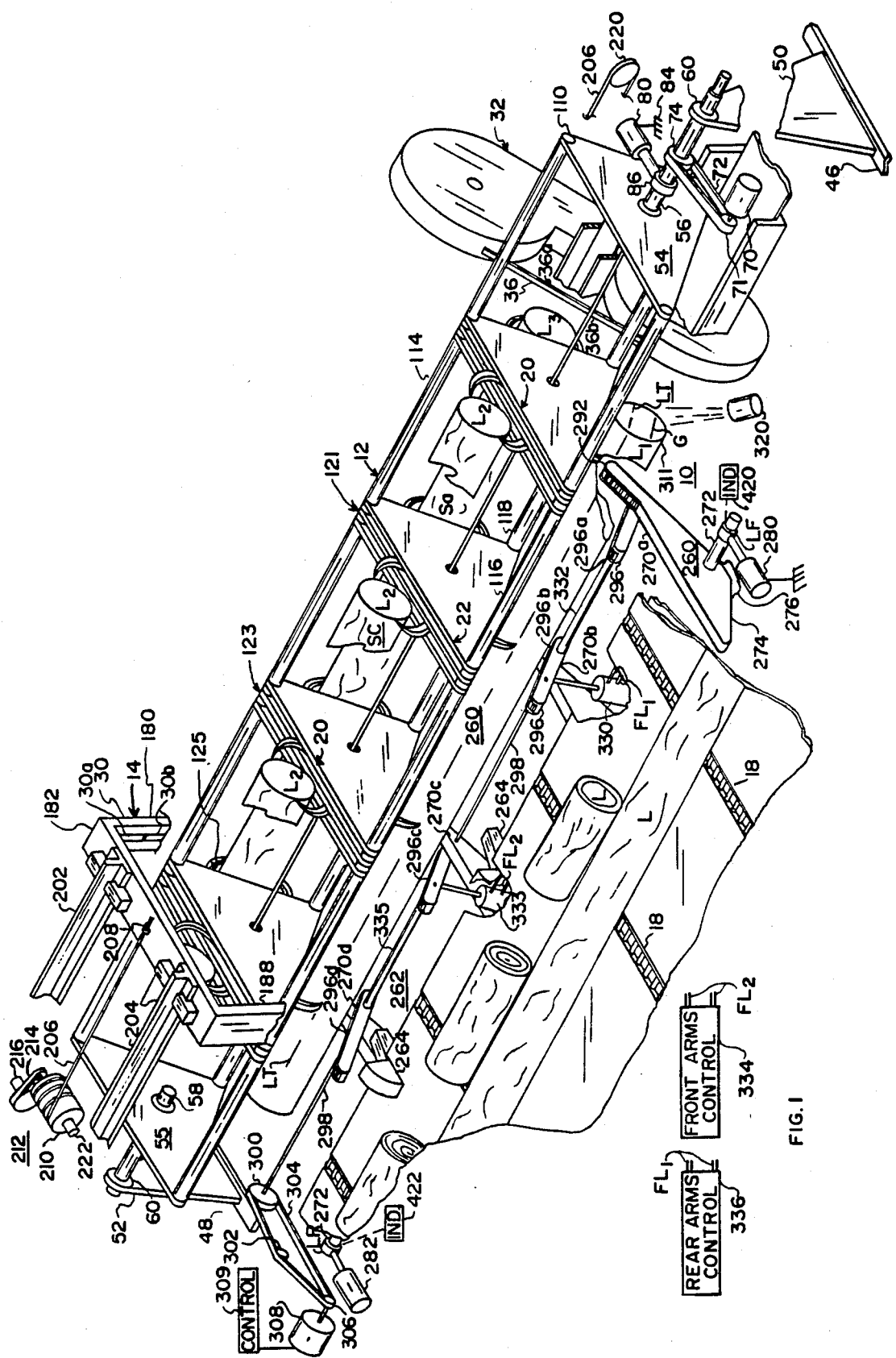
FIG. 1 is a pictorial view of an embodiment of the invention as seen from a position to the left of the front of an embodiment of the invention, the view being partially schematic and including in block diagram form certain of the controls of the system.
Figure 2:
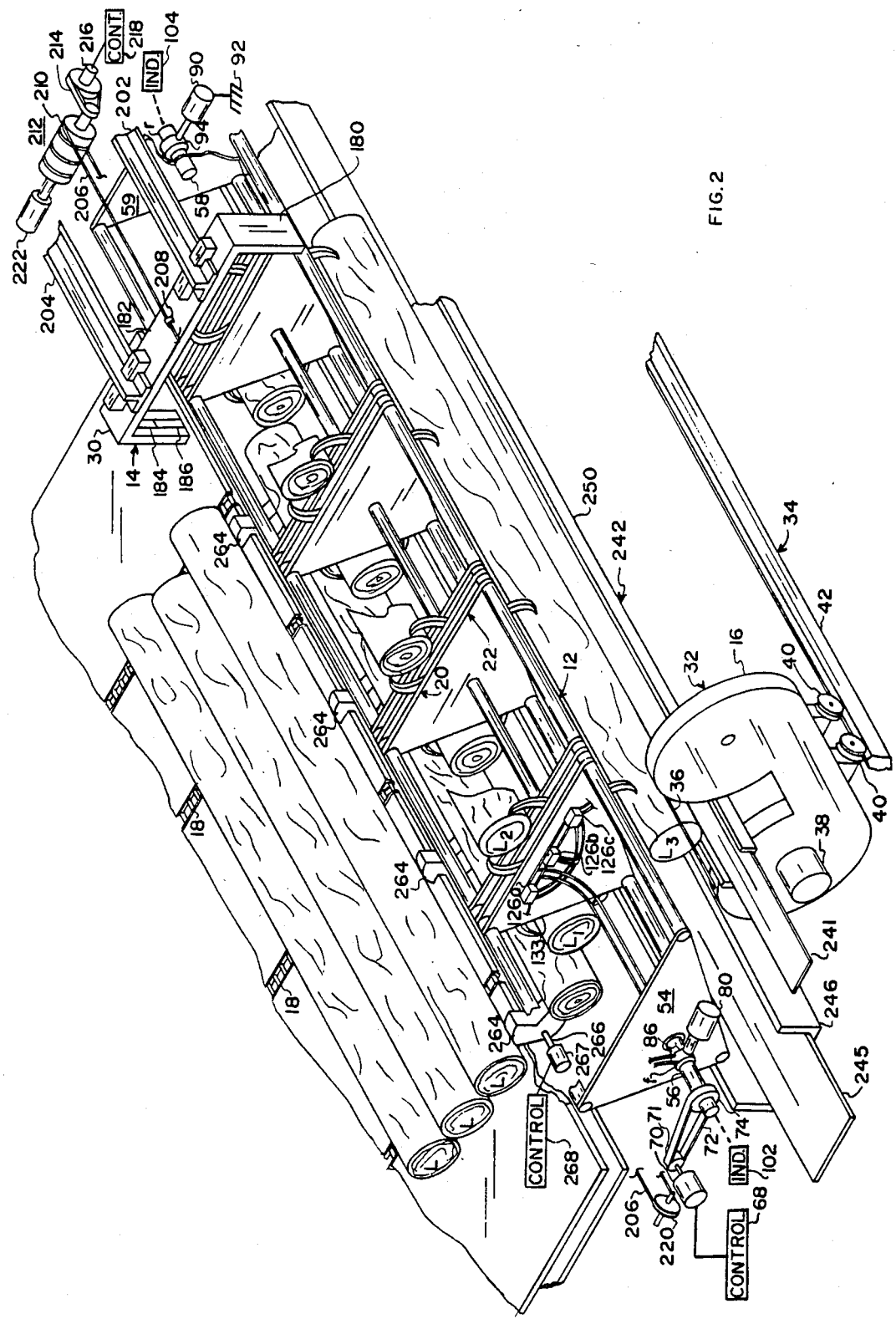
FIG. 2 is a pictorial view of an embodiment of the invention as seen from a point to the right of the front of an embodiment of the invention, the view being partially schematic and including in block diagram form certain of the controls of the system.
Figure 3:
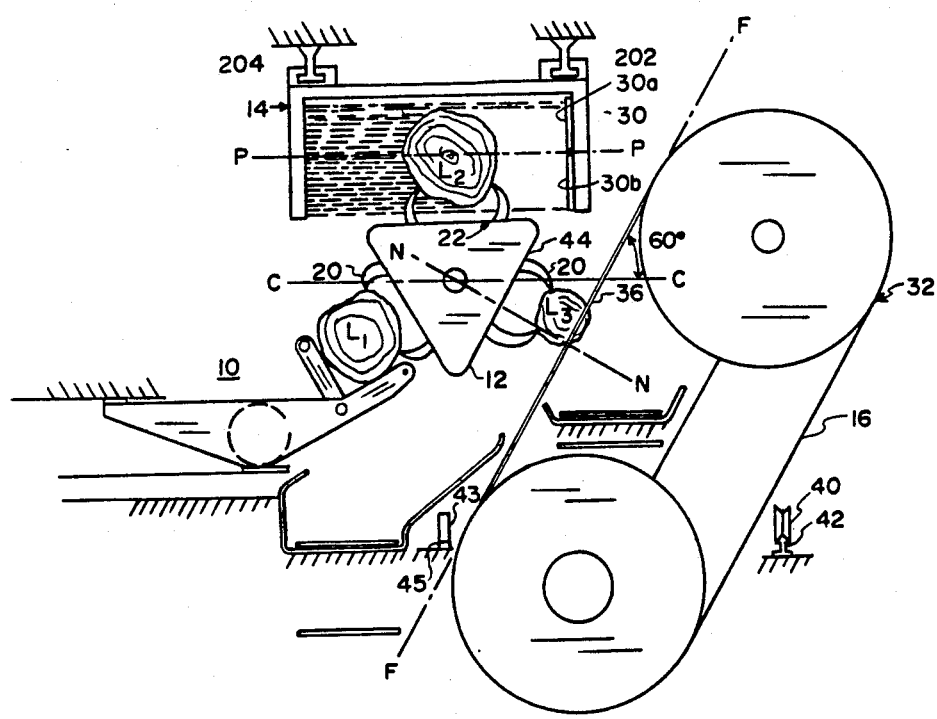
FIG. 3 is a schematic illustration of the system of the invention as it would be viewed from the front as seen in FIGS. 1 and 2.

FIGS. 1–3 particularly illustrate the four major subsystems of an improved log breakdown system. These comprise log loader 10, revolver 12, scanner assembly 14, and traveling bandmill 16. Logs L to be processed are fed to log turner/loader 10 by conventional drag chains 18, and log loader 10 effects a selective rotation of the log and supplies it to revolver 12. Log gripping dog sets 20, on each side of each frame 22 of revolver 12, clamp a log L on revolver 12 at a first, receiving, position, as shown for log $L_1$. Then, upon command, revolver 12 rotates it to the second, upper, scan position, shown by log $L_2$. Finally, upon command, revolver 12 rotates to the third, saw, position, as shown by log $L_3$. Scanner assembly 14 includes an optical scanner 30 which is moved longitudinally along a log in the upper, log $L_2$, scan position, and it provides electrical outputs indicative of vertical extremes, upper and lower, of the log at measured distances along the log to provide data for the profile of the log. After such data is obtained, the log scanned is revolved by revolver 12 to the third, saw, position, as indicated by log $L_3$, after which revolver 12 is positioned in accordance with this data to a selected position with respect to bandmill 16, enabling a cut of this log by bandmill 16 along a selected plane corresponding to a best opening face (B.O.F.) for that log.

Bandmill 16 generally consists of a saw assembly 32 and rail support assembly 34 (FIG. 2) upon which saw assembly 32 moves to make a cut along a fixed plane F—F (FIG. 3). Transport of bandmill 16 along rail support assembly 34 is effected by conventional drive means (not shown). Saw assembly 32 conventionally consists of a sawing band 36 conventionally supported by means not shown and conventionally driven by a motor 38 (FIG. 2). Sawing band 36 has dual cutting edges 36a and 36b (FIG. 1), and thus cutting is effected in both directional movements of saw assembly 32 and is supported by a pair of rimmed, spaced wheels 40 which run on fixed mounted outer "V" rail 42, and flat rimmed wheel 43 riding on a flat inner track 45, diagrammatically illustrated in FIGS. 10a–10e. The sawing plane F—F of sawing band 36 is at an angle of 60° with respect to horizontal plane C—C, a reference plane for the system (FIG. 3). Accordingly, plane F—F is normal to a radial line N—N through the center of revolver 12, and is also normal to side 44 of revolver 12 when that side surface is oriented as shown in FIG. 3.

Revolver 12 is generally parallel to bandmill rail 42 and is selectively movable, horizontally, with respect to bandmill 16 so that revolver 12 may selectively position a log with respect to bandmill 16. Such movability is enabled by end frame members 50 and 52, which are slidably mounted on sliding supports 46 and 48, which in turn support each end of revolver 12. Stub shafts 56 and 58 on the front and rear ends 54 and 55, respectively, of revolver 12 are rotatable by bearing assemblies 60 on front and rear frame members 50 and 52, and front stub shaft 56 is rotatably driven, upon command, from motor control 68 by hydraulic drive motor 70, schematically illustrated as driving through sprocket 71, sprocket chain 72, and sprocket 74 affixed to shaft 56. Alternately, hydraulic motor 70 would drive shaft 56 through a reduction gear box to rotate frame 12. Motor 70 is controlled by motor control 68 to effect stepped or automatic stopping of rotation at 120° points in order to effect precisely related operation of the system in terms of the three operating positions shown.

Horizontal positioning of the front end 54 of revolver 12 is effected by front hydraulic cylinder 80, which in turn is controlled by electrically controlled valve 82 (FIG. 4) by which cylinder 80 may be operated in both an expanding and retracting mode. Front hydraulic cylinder 80 is coupled between a fixed mounting support 84 (schematically shown in FIG. 1) and rotary coupling 86 around stub shaft 56 and lies in a horizontal plane and generally along a line perpendicular to the axis of stub shaft 56. Similarly, rear hydraulic cylinder 90 (FIG. 2) is employed to effect horizontal positioning of the rear stub shaft 58 of revolver 12, it being similarly mounted between a fixed support 92 and movable coupling 94 to rear stub shaft 58, and it is operated under the control of rear electrically controlled valve 96 (FIG. 4). Control valves 82 and 96 are typically electrically operable upon appropriate signal input from valve controls 98 and 100 to either extend or retract hydraulic cylinders 80 and 90. For manual operation as shown in FIG. 4, valve controls 98 and 100 would simply include manually operated electrical switches (as per hand control H), which provide controlled signals to the control valves to effect a selected horizontal position of revolver 12.

Conventional front and rear end linear indicators 102 and 104 (FIGS. 2 and 4) would be conventionally coupled between a reference stationary position and shafts 56 and 58, respectively, and would provide either or both a visual readout of a horizontal distance relating revolver 12 and sawing plane F—F of bandmill 16 and signals indicative of the same. Thus, from observation of the positions, an operator may position revolver 12 where desired as per log configuration.

FIG. 4 further illustrates a system for the automatic setting of the positioning of revolver 12 in accordance with signals developed from a computer, which in turn derives data from scanner assembly 14. This system will be further described below.

Revolver frame 22 is generally triangular in cross section, and front and rear frame members 54 and 55 thereof are connected by three corner bracing rods 114, 116, and 118 (FIG. 1). These rods in turn support triangular-shaped clamp or dog support units 120, 121, 123, and 125 which are generally equally spaced between front and rear frame members 54 and 55. Typically, the length from front frame member 54 and rear frame member 55 would be 18 to 22 feet, but would be chosen in terms of the length of logs to be handled, e.g., 8'-4", 12'-4", 16'-4", etc. The number of dog support units and spacing may vary with such lengths.

Referring additionally to FIGS. 5a and 5b, showing an exploded view of one of the dog support units, it will be noted that each includes three dogs 127, separately labeled A, B, and C, wherein a tong $T_1$ from each dog is on one side of center plate 130, and the other tong $T_2$ of that dog is on the other side of this plate. There are four sets each of dogs A, B, and C as illustrated in FIG. 1. Each tong of each dog of each set is driven by a hydraulic cylinder positioned appropriately on one or the other side of plate 130, and outer plates 132 and 134 effect a sandwiching of the tong/cylinder combinations between plates, and together the plates effect pivotal supports for the tongs, by means of interconnecting pins 136, and for the cylinders, by means of pins 138. The pins extend through all three plates. Cylinders $a_1$ and $a_2$ drive tongs $T_1$ and $T_2$ of dog A, cylinders $b_1$ and $b_2$ drive tongs $T_1$ and $T_2$ of dog B, and cylinders $c_1$ and $c_2$ drive tongs $T_1$ and $T_2$ of dog C. Fluid lines FL (FIG. 6) from each cylinder are coupled as illustrated in FIG. 6 and pass outboard through a conduit 140 as line sets $FL_a$, $FL_b$, and $FL_c$.

Figure 6:
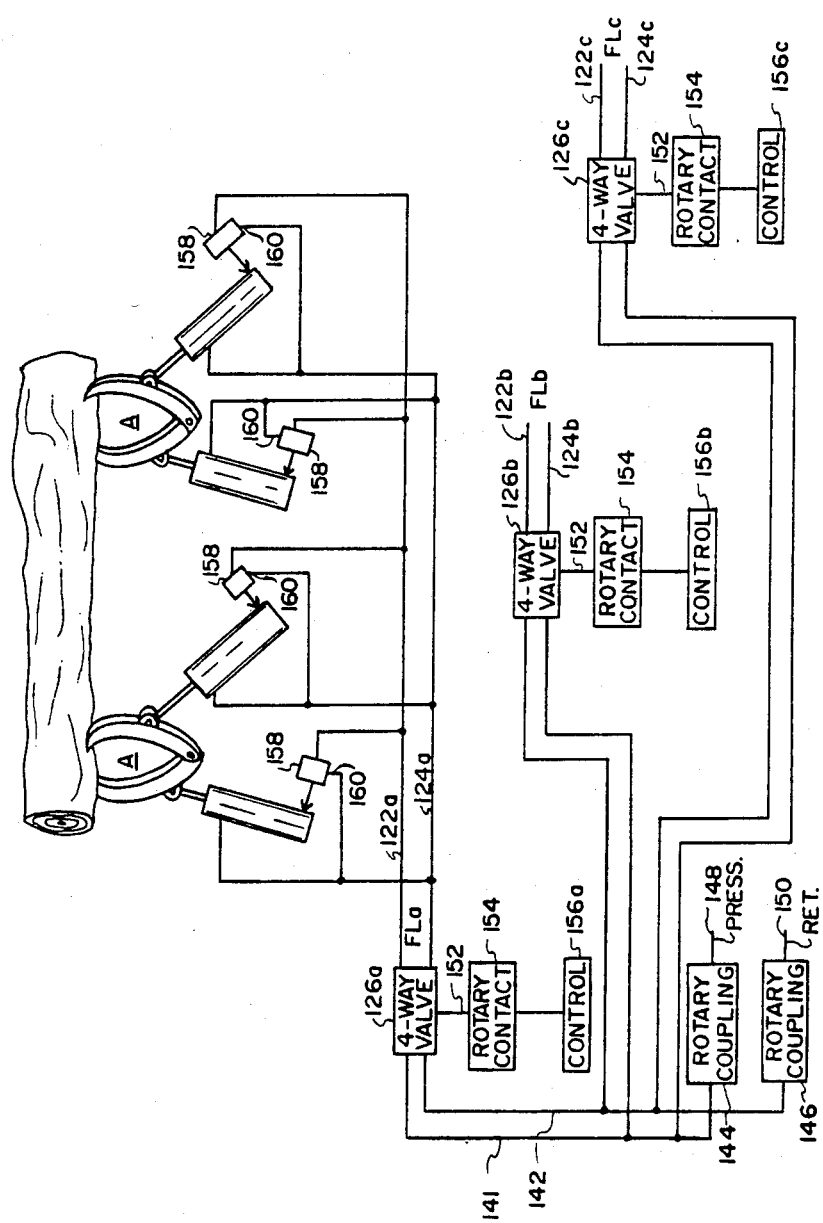
FIG. 6 is a schematic illustration of a control system for the operation of dog assemblies, illustrated in greater detail in FIGS. 5a and 5b.

FIG. 6 illustrates, schematically, a system for the remote operation of the dogs, particularly illustrating the operation of two of the dogs on the same side of revolver 12, dogs A. Significantly, it will be noted that all cylinders for dogs A are connected in parallel to two fluid lines 122a and 124a and through a conventional four-way valve 126a (a valve of the type where one electrical signal connects one input fluid line to one fluid output line, and with the application of a different signal, the connection of the output lines to the input lines are reversed). Valves 126b and 126c supply fluid lines $FL_b$ and $FL_c$ for dogs B and C, respectively. Valves 126a–126c would typically be mounted on one of the triangular frame plates, illustrated as being mounted on dog frame plate 133 in FIG. 2.

As only dogs A are shown for one side of revolver 12 in FIG. 6, lines 122b–124b of dogs B on one of the other sides, and lines 122c–124c of dogs C on the third side of revolver 12 are shown unterminated. However, they would be connected in the same fashion as described to four-way valves 126b and 126c, respectively. Pressure and return inlet lines 141 and 142 to the four-way valves are coupled through rotary couplers 144 and 146 to stationary lines 148 and 150 to an appropriate pressure source (and return) of hydraulic fluid (not shown). The four-way valves are typically controlled through electrical line 152 and rotary contacts 154 to an outboard (removed from the revolver) switching assembly having three switching controls 156a, 156b, and 156c, whereby any one of the three four-way valves may be operated in either mode described to effect either an expansion or contraction of the hydraulic cylinders to pick up or release a log. Rotary couplings 144 and 146 are secured to conduit 140 at one end of revolver 12 by a concentric rotary coupling assembly (not shown) connecting stationary fluid lines 148 and 150 to rotating fluid lines 141 and 142, respectively. This coupling assembly also includes combinations of moving and stationary contacts 154, arranged in conventional concentric positions to effect their purpose as described.

It is significant that all of the dogs on one side of revolver 12, which would together engage a discrete log, are operated in parallel, whereas by this technique, the force of the dogs equalize along the log, and no substantial force is applied to a log until all the dogs of a group are brought into engagement with the log. In this fashion, the dogs do not effect a position distorting effect on a log.

As a further feature of the present system, a lock valve 158 is connected in line with the expanding chamber of each dog operating hydraulic cylinder to prevent an external force or back force from being applied on a piston of the cylinder through lines 122a, 122b, or 122c. If an unequal pressure force were to be transmitted back to the other cylinders on the same side of the log, it would cause an unintended extension of a piston, and thus an unintended grappling force would be applied to a log. Lock valve 158 thereby prevents a tong from backing up when an opposite tong contacts a log. The lock valve is a check or one-way valve (normally permitting flow in the direction of the arrow) which, when operated by pilot pressure input 160, opens completely. This occurs when the pilot input is pressurized by supply line 124 (a, b, or c, as is the case) connecting to the contraction port of each cylinder. Thus, back flow through lock valve 158 is impermissible except when line 124 is operated by four-way valve 126 (a, b, or c, as is the case) to be a high pressure line, and line 122 (a, b, or c) a low pressure line as controlled by four-way valve 126 (a, b, or c). By virtue of this, if the tong of one of the dogs is pressed by a log, it will not cause a like side tong of other dogs to be pressed back into a log. Accordingly, only intentional engagement by tongs of logs are effected, this being by deliberate operation of a four-way valve.

Significantly, by virtue of the system shown in FIG. 6, when a closing pressure is applied to line 122 (a, b, or c), and thus to all cylinders of the dog pairs on that side of revolver 12, all related tongs will initially move toward a log. Significantly, if any tong of any tong pair engages a log prior to all of the tongs of all of the tong pairs engaging the log, the engaging tong or tongs will simply stop as there will be no pressure build-up until all of the tongs of all of the tong pairs engage the log. When all of the tongs do engage the log, then they will all equally provide pressure against the log, and none of them will prematurely apply force to the log which would have a dislocating force on the log. The log would simply be gripped in accordance with its configuration.

Referring to FIG. 1, scanner assembly 14 comprises an electro-optical mechanical assembly which includes sensor assembly 30 comprising photoelectric sensors 30a and 30b. Sensor assembly 30 is moved longitudinally to scan a log, shown by log $L_2$, when revolver 12 is rotated to a position where the log to be scanned is in its uppermost position (e.g., log $L_2$) following a movement clockwise of 120° after the log having been previously obtained from log turner/loader 10. Scanning of the log is horizontal, being effected by conventional vertical positioned photoelectric sensors, such as Optimux (registered trademark) scanner units made by Opcon in Everett, Wash. These photoelectric sensors, responsive to modulated infrared light, are of a type which provide a distance measurement output indicative of the first point along its operating face, from a reference, where it first senses light. As an example, sensors 30a and 30b (FIG. 4) would be mounted one above the other on vertical arm 180 of U-shaped frame 182 of sensor assembly 30. Sensor 30a would be set to provide a measured series of outputs representative of the distance from reference plane P—P (FIG. 3) upward, and sensor 30b would be set to provide a measured series of outputs representative of the distance of the log below reference plane P—P. Coordinate light sources 184 and 186 (FIG. 4), providing modulated infrared light, would be mounted vertically at corresponding elevations on opposite arm 188 of U-shaped frame 182 for coordinate reception by sensors 30a and 30b, respectively.

U-shaped frame 182 is moved longitudinally on a pair of horizontal tracks 202 and 204 (partially shown), enabling scanning across both the top and underside of a log at any point, or continuously along the length of a log $L_2$ held by revolver 12. The scanner tracks also lie parallel with horizontal rails 42 and 45 upon which saw assembly 32 is moved longitudinally, and the angle of cut or plane of cut of saw band 36 lies at an angle of 60° with respect to the horizontal plane of scanning by scanner assembly 14. U-shaped frame 182 is controllably moved longitudinally with respect to revolver 12 by a cable 206 which is attached by a bracket 208 to U-shaped frame 182, cable 206 being conventionally attached to drum 210 of winch 212 and driven by motor 216 through belt drive 214, selectively controlled by motor control 218 (FIG. 2). At the opposite end, cable 206 is supported conventionally on pulley 220.

The longitudinal position of sensor assembly 30 along a log is determined from an electrical output from a conventional shaft encoder 222 which is connected to drum 210 and typically is connected to provide an output indicative of the longitudinal distance of sensor assembly 30 from the coupling point f of front hydraulic cylinder 80 on stub shaft 56.

The outputs from photoelectric sensors 30a and 30b and the distance signal from shaft encoder 222 are fed via electrical leads EL to a display 230 (FIG. 4) where readout 232 displays the upper side log dimension SU from reference plane P—P, readout 234 displays the lower side log dimension SL from plane P—P, and readout 236 provides a display of the distance (FIG. 4) of sensor assembly 30 from a vertical line through point f. The measured distances are ultimately for the purpose of determining a desired position of revolver 12 with respect to bandmill 16.

For purposes of illustration, it will be presumed that in determining this selected position, which will be in terms of positions for the front and rear ends of revolver 12 with respect to sawing band 36, three measurement points along the log will be considered. In order to examine the method of such determination, reference is made to FIG. 7.

While as shown and discussed, profile measurements are made on both sides of a log, it is to be appreciated that one side of the log may be referenced to a line when loaded onto the revolver, and then with the contour of this side assumed to follow this line, only the other side would be measured. From the known relative position of this line to the log and the measured side, the overall contour would be estimately computed.

Figure 7:
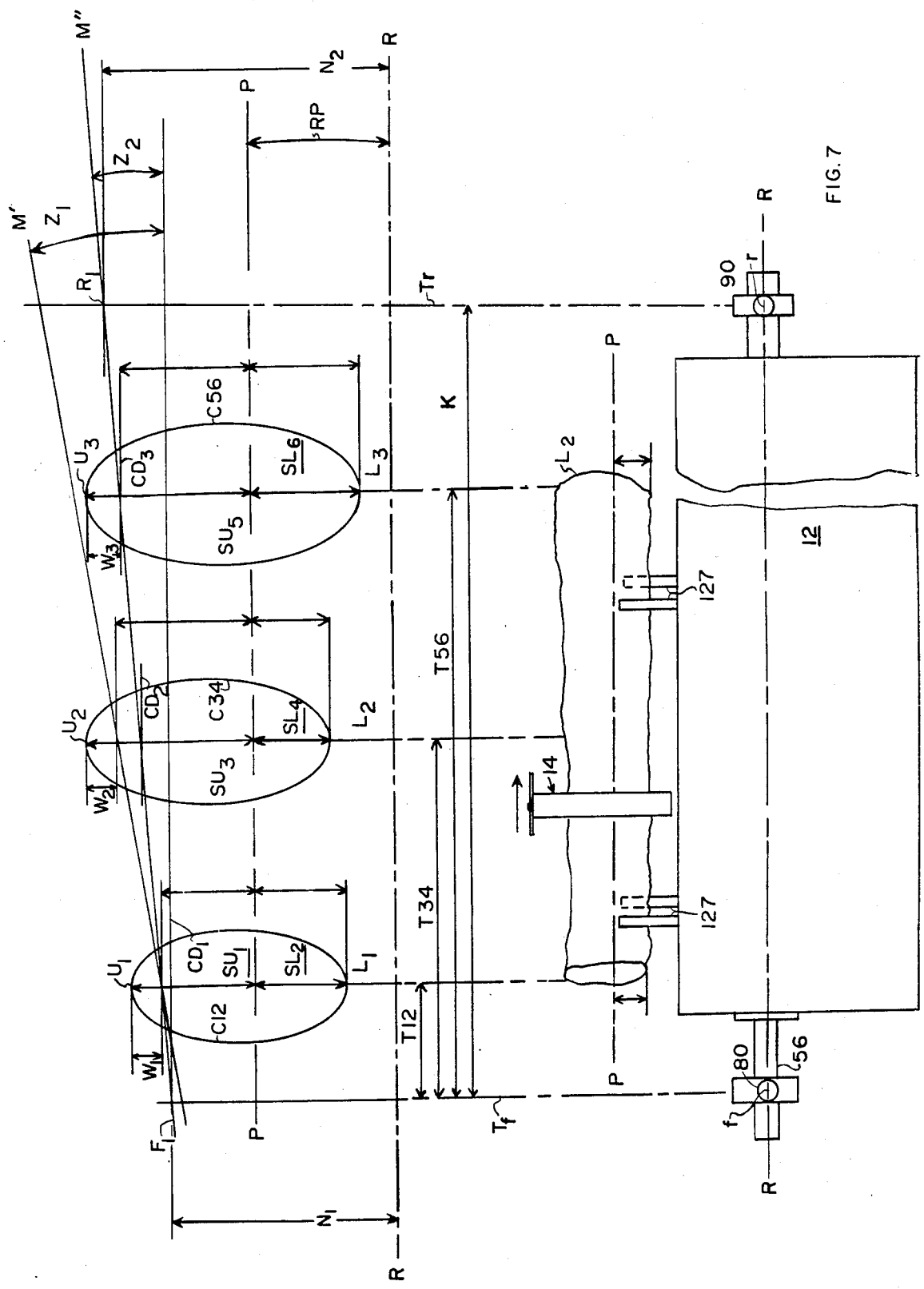
FIG. 7 is a schematic illustration showing the position of a log being scanned to determine its profile and its relationship with respect to the axis of a revolver and scanner and related measurements and computations.

FIG. 7 illustrates, schematically, a log $L_2$, actually only a partial length of the log, held by two of dogs 127 on revolver 12 in a position to be scanned by scanner assembly 14 as it is moved left to right in the direction of the arrow.

FIG. 7 also illustrates output measurements obtained from optical sensors 30$a$ and 30$b$ (FIG. 4) at three distance points $T_{12}$, $T_{34}$, and $T_{56}$, with the numerals being indicative of the distance from left reference line $T_f$ corresponding laterally, as shown, to point f on the front or left side of revolver 12 where front cylinder 80 would engage stub axle 56 (FIG. 1) of the revolver. At distance point $T_{12}$, optical scanner 14 provides upper log contours, distance measurements, $SU_1$ from reference plane P—P to point $U_1$, as measured by sensor 30$a$ and a lower distance $SL_2$ from plane P—P to point $L_1$ measured by sensor 30$b$. Plane P—P is an arbitrary machine system reference, and, as shown, it is illustrated as being at a horizontal level mid point between the vertically arranged photosensors 30$a$ and 30$b$ (FIG. 4). Similarly, readings are taken to reveal upper distance $SU_3$ from reference plane P—P to point $U_2$ and lower distance $SL_4$ from plane P—P to point $L_2$ at station $T_{34}$, and the upper distance reading $SU_5$ and lower distance reading $SL_6$ are taken at station $T_{56}$.

Next, and as shown in FIG. 7, the upper and lower contour dimensions are plotted in terms of circles $C_{12}$, $C_{34}$, and $C_{56}$, represented pictorially by the elliptical shapes, these being at corresponding dimensional points along the log $L_2$. These circles are drawn from the sum of the upper and lower dimensional readings and locate upper and lower horizontal tangents at points U and L as a distance from reference plane P—P. The sum of two of these dimensions, e.g., $SU_1+SL_2$, determine the diameter of one of the circles.

At this point, it will be assumed, by way of example, that it is desired to make a first cut through log $L_2$ to achieve a flat side which is no less than four inches in width to thus make possible a second and parallel cut from the log to effect a 2×4-inch board. In order to be most economical, the plane of the first out should be along a plane which bears a minimum absolute angle, angle Z, to the plane P—P and, of course, if the log were perfectly round and perfectly uniform, this angle would be zero.

With the three sets of measurements to work with as per the illustration, two possible angles are computed, one, angle $Z_1$, wherein circles $C_{12}$ and $C_{34}$ are employed, and one, angle $Z_2$, wherein circles $C_{12}$ and $C_{56}$ are employed. In each case, the distance from plane P—P to a chord of a 4-inch length is computed, using, as shown, a circle with a diameter equal to the upper and lower distance measurements indicated by optical sensors 30$a$ and 30$b$. Thus, in the case of first circle $C_{12}$, the diameter would be equal to $SU_1+SL_2$, and the chord location of chord $CD_1$ would be in terms of a chord four inches long. Similarly, the diameter of circle $C_{34}$ would be equal to $SU_3+SL_4$, and the diameter of circle $C_{56}$ would be $SU_5+SL_6$, and 4-inch chords $CD_2$ and $CD_3$ are drawn through them.

FIG. 7 illustrates the construction of the pertinent angles, angles $Z_1$ and $Z_2$, by virtue of line M', a line drawn through the intersection of the midpoints of the 4-inch chords of circles $C_{12}$ and $C_{34}$, and by line M'' drawn through the intersection of the midpoints of the chords of circles $C_{12}$ and $C_{56}$. The lines, and thus the angles, are comparable in FIG. 7, and it will be noted that the smallest absolute angle, angle $Z_2$, is obtained by line M''. Actually, as will be noted, M' does not intersect circle $C_{56}$ at all, and thus if a cut were made along M', it would be totally outside the log over a portion of the length of the log.

Mathematically, angle $Z_2$ is determined as follows:

$$\text{Tangent } Z_2 = \frac{(SU_5 - W_3) - (SU_1 - W_1)}{T_{56} - T_{12}}$$

where the W terms are $$W = \frac{d}{2} - \frac{1}{2}\sqrt{d^2 - c^2},$$

c being defined as the length of the chord, and d as the diameter of the circle in which the chord appears. Since with respect to a given d of a circle, $$d = SU + SL$$

$$W_3 = \frac{SU_5 + SL_6}{2} - \frac{1}{2}\sqrt{(SU_5 + SL_6)^2 - c^2}$$

$$W_1 = \frac{SU_1 + SL_2}{2} - \frac{1}{2}\sqrt{(SU_1 + SL_2)^2 - c^2}.$$

From these equations, it is to be readily appreciated that the computation of tangent Z, e.g., tangent $Z_2$, is directly computable from measured quantities and a selected minimum chord length.

With angle $Z_2$ established, the next calculations are for two distances: one labeled $N_1$, which is the distance between the intersection of a point $F_1$ in plane M'', with a line normal to the axis R—R of revolver 12 which passes through point f on this axis, it being where front end cylinder 80 couples to revolver 12; and the other distance, labeled $N_2$, is the distance between the intersection of a point $R_1$ in plane M'', with a line Tr normal to the axis of revolver 12 passing through point r on the axis of the revolver where the rear end cylinder 90 couples to the rear end of revolver 12. These computations, in terms of the quantities illustrated in FIG. 7, are as follows:

$$N_1 = RP + SU_1 - W_1 - T_{12} \tan Z_2$$

$$N_2 = RP + SU_5 - W_3 + (K - T_{56}) \tan Z_2$$

where term RP is defined as the perpendicular distance between line R—R (the axis of revolver 12) and reference plane P—P. The term K is defined as the longitudinal distance on line R—R between points f and r.

Figure 8:
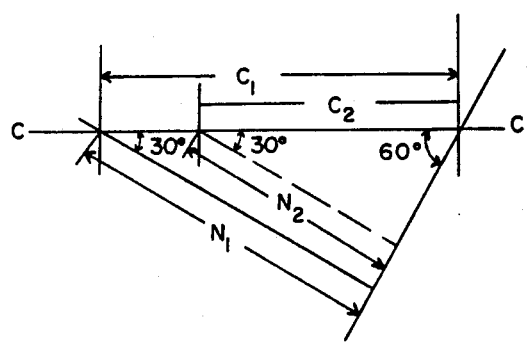
FIG. 8 is a geometric diagram illustrating the relationship between certain measurements illustrated by FIG. 7b and further computations employed in the relative positioning of subsystems of the invention.

These distances define the radial distance from front and rear points on the axis R—R of revolver 12 to a desired sawing plane M"$_2$ in a direction normal to the R—R axis and may be manually computed or performed by a computer. Once computed, revolver 12 is then rotated clockwise 120° to a point where the scanned log, L$_2$ as described, would now be in the saw position shown for log L$_3$ (FIG. 3). With this posture for log L$_3$, the distances N$_1$ and N$_2$ become distances designated by dimension lines labeled N$_1$ and N$_2$ between the axis of revolver 12 and plane F—F of a desired cut (FIG. 3). Distance lines labeled N$_1$ and N$_2$ are illustrated in FIG. 8 as being inclined at an angle of 30° for a saw angle of 60° from the horizontal plane C—C of revolver 12, this inclination being further indicated by line N—N in FIG. 3. Since revolver 12 is movable only along horizontal plane C—C, it is necessary to translate the distances N$_1$ and N$_2$ into their horizontal resultants, C$_1$ and C$_2$, shown in FIG. 8, and this involves the division of the N quantities by the sine of 60° to obtain the C quantities, or $$C_1 = N_1/\text{sine } 60°$$

$$C_2 = N_2/\text{sine } 60°$$

Figure 9:
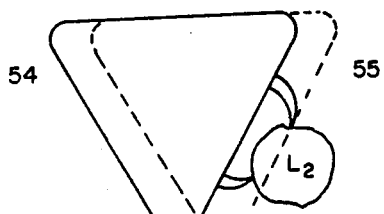
FIG. 9 is a schematic view further illustrative of the effect of the employment of the dimensional quantities derived as per FIG. 8.

These distances define the desired horizontal distances from the axis of revolver 12 along a horizontal plane along line C—C to the sawing plane F—F, and the next step is to horizontally move revolver 12 so that it is relatively positioned to comply with the terms of distances C$_1$ and C$_2$, preparatory to actual sawing, this being done with sawing band 36 beyond one of the ends of the log. Movement of revolver 12 is accomplished by operating valve control 98 (FIG. 4) to in turn operate front control valve 82 to operate front cylinder 80 (FIG. 1) in a direction and magnitude which will effect the distance C$_1$ (FIG. 8), this being observable from front, linear, distance indicator 102 (FIGS. 2 and 4). Similarly, rear valve control 100 is operated to cause rear control valve 96 to operate rear cylinder 90 whereby the horizontal distance C$_2$ is accomplished. From these operations, front and rear positions of front frame member 54 and rear frame member 55 (shown as a dashed line) would assume positions as approximately shown in FIG. 9. Next, sawing band 36 would be moved along log L$_3$, which is now in the saw position (as per FIG. 3) to make the opening face cut in log L$_3$ (previously scanned as described for log L$_2$). Then, the outer flitch slab 240 (smaller half round slab) of log L$_3$ (LB of FIGS. 10d and 10e) would drop off onto belt 241 of conveyor 242 and be carried off as waste, leaving a 4-inch minimum width slice, face cut 248, on log L$_3$ or LB. Next, revolver 12 would be operated by revolver control 68 to rotate one-third revolution clockwise. During this rotation, the dogs holding this log would be released by the operation of four-way valve 126c, and the remaining portion of log L$_3$, or log LB (FIG. 10e), would drop on belt 245 of conveyor 246 and be carried off, enabling further cutting of this log parallel to plane side 248, as may be determined by a further analysis of the log, and by computations which would determine the most economical breakdown of the log. Conveyor belts 241 and 245 are driven by means not shown and are partially surrounded by guide sides 250 and 252.

There has thus far been described a system for processing logs which have been supplied to revolver 12. Additionally, and as a further feature of this invention, there is provided a coordinate log loader 10 for loading logs onto revolver 12. This assembly consists of turner/loader 260 and stop-and-load 262, and these are shown in relation to one another and revolver 12 in FIG. 1.

Figure 10B:
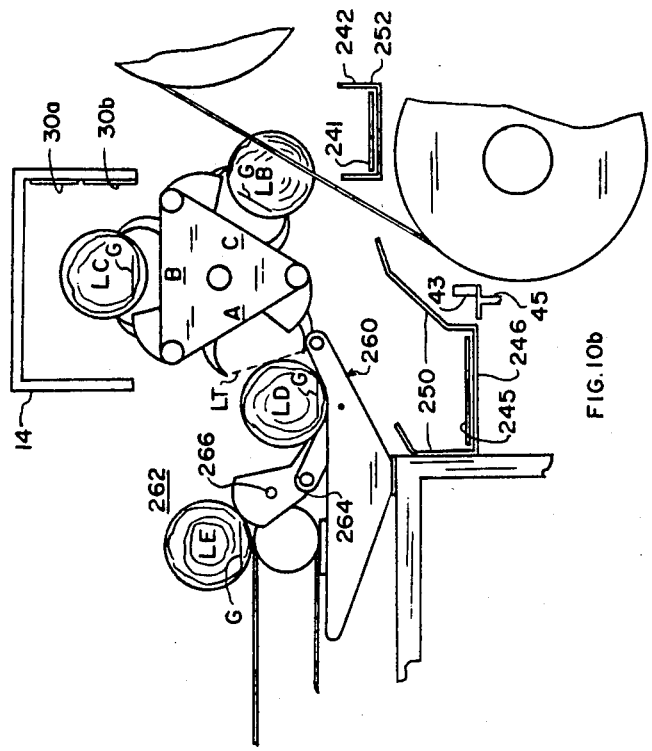
Figure 10A:
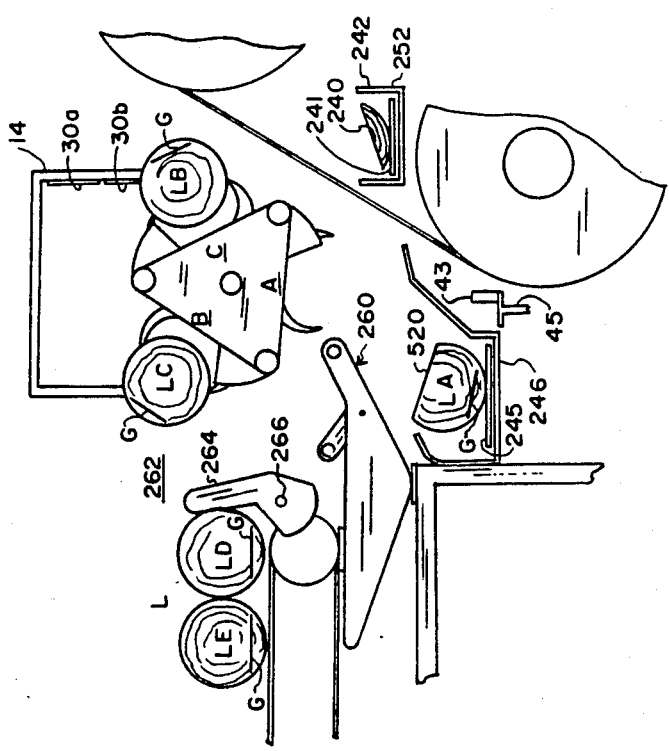

Stop-and-load 262 is schematically shown in FIGS. 10a–10e, which generally illustrate the combined operation of stop-and-load 262 and turner/loader 260 in the positioning of a log for reception by revolver 12. Stop-and-load 262 employs four spaced arms 264, being illustrated in FIGS. 1 and 2 and proportionally spaced as shown. They are coupled together by a shaft 266 driven by a hydraulic motor 267 and rotatably controlled by motor control 268 operated by an operator. Logs L are moved to engagement with arms 264 by conventional drag chains 18 which are conventionally driven by means not shown. FIG. 10a illustrates stop-and-load arms 264 in a generally vertical position to enable a first log LD to be moved by drag chains 18 to the position shown wherein log LD is stopped pending rotation of shaft 266 and the load arms by operator control. Logs LC, LB, and LA precede log LD and appear as shown. By rotation of arms 264 from the position shown in FIG. 10a to that shown in FIG. 10b, the logs are progressively handled as per the sequence illustrated by FIGS. 10a–10e, during which the next log in line is blocked, pending the completion of a load cycle. During each load cycle, one of the logs on stop-and-load 262 is delivered to turner/loader 260.

Turner/loader 260 basically consists of a plurality, four are shown in FIG. 1, of spaced turner/loader members 270a–270d, interconnected by a central support, illustrated by tie rod 272, each turner/loader member being slidably supported, as schematically illustrated by a surface 274 slidable on a base support surface 276, as shown in FIG. 1. Tie rod 272 is laterally movable by both front and rear hydraulic cylinders 280 and 282 whereby, as will be further described, an alignment may be maintained between turner/loader 260 and revolver 12.

Referring to FIGS. 1 and 11a and 11b, a first drag chain 290 is supported on a fixed arm region 292 of each turner/loader member, and a second drag chain 294 is supported on a movable arm 296, such an arm being pivotally attached to each of the fixed arm regions of a turner/loader member. Drag chains 290 and 294 of each turner/loader member are driven via a shaft 298 through a sprocket 300, idler 302 by chain 304, and sprocket 306 by hydraulic drive motor 308 as controlled by control 309. Sprockets 310 and 312 (FIGS. 11a and 11b) on shaft 298 drive chains 290 and 294, the chains being rotatably supported at non-driven ends by idler sprockets 314 and 316.

Figure 10D:
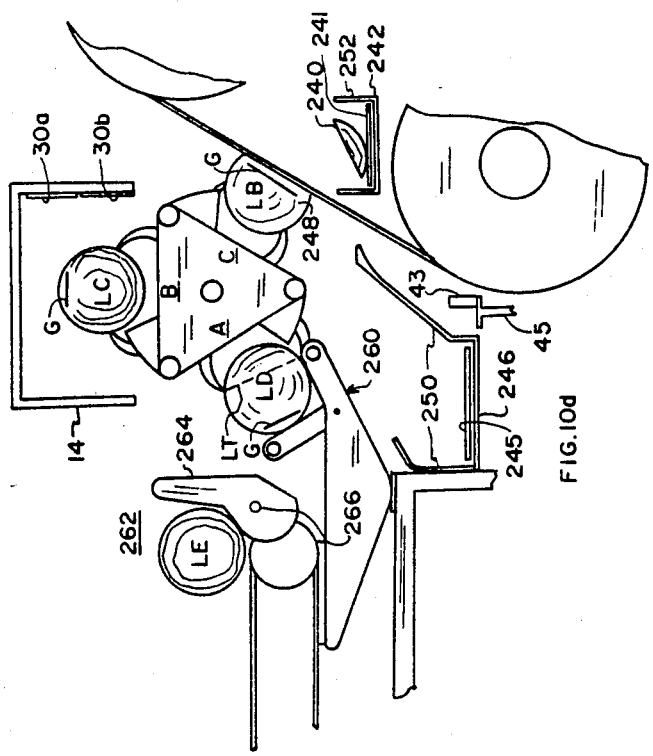
Figure 10C:
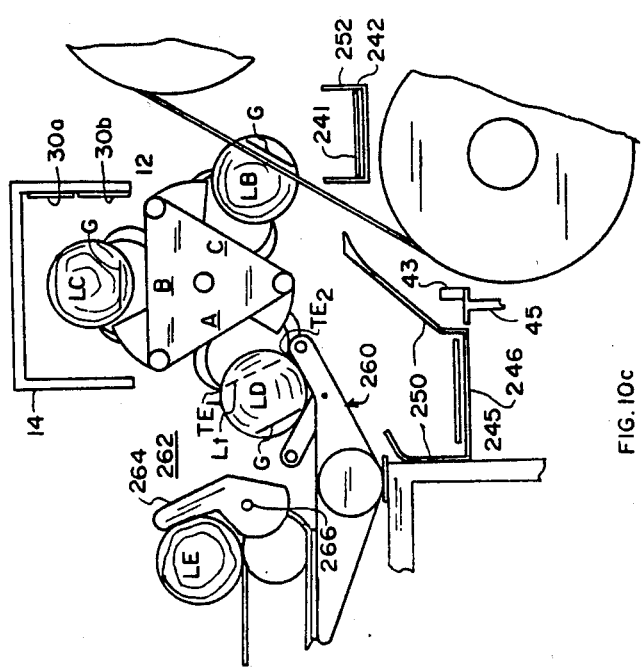

Turner/loader 260 functions to both laterally and rotationally position a log for grabbing of it by revolver 12 at selected points by the dogs of revolver 12. In order that an operator be shown where in space the tongs of dogs will engage a log, a plane of light LT (FIG. 10) from laser light source 320 (attached to or movably following revolver 12) is aligned with a plane which intersects tong ends TE$_1$ and TE$_2$ when a side of revolver 12 is at the eight o'clock position as shown in FIG. 1. Referring additionally to FIGS. 10c and 10d, with this plane of light directed along a log, there will appear on the end of the log a line LT, and it is the operator's job to assure that when the log is grabbed or engaged by revolver 12 that line LT through tong ends TE$_1$ and TE$_2$ (FIG. 10c) is parallel with a best operating face cut for that log. This determination may be made simply by the operator's judgment or may be determined from a prior analysis of the log, e.g., by prior optical scanning of the log, and when this is done, there may have been impressed on the end of the log a marking line G, this line representing a line parallel with a selected best operating face for the log. With such a line G, the operator would then orient the log so that line G is parallel with light line LT.

The manipulation to effect the foregoing grabbing of a log by revolver 12 would be achieved by the control operation of chains 290 and 294, which would rotate a log under the control of motor control 309 coordinately with angular manipulation of the movable arms 296, these being controlled by front and rear arms controls 334 and 336. To further examine this, the angular position of the front set of movable arms, labeled 296a and 296b, are separately positionable by front control cylinder 330, these arms and cylinder 330 being interconnected by a rigid coupling member 332. Similarly, rear movable arms 296c and 296d are movable together by rear cylinder 333, rear cylinder 333 being coupled to arm 296c, and arms 296c and 296d being rigidly connected together by coupling member 335. Separate control of cylinders 330 and 333 is provided by front arms control 334 and rear arms control 336, these being coupled to the cylinders by fluid lines $FL_1$ and $FL_2$, control being by an operator whereby a log having a fairly irregular configuration may be manipulated into a selected alignment with respect to revolver 12.

FIG. 12a further illustrates a drive mechanism for shaft 298, in this instance being driven by a hydraulic motor 350 via sprocket 352, chain 354, and sprocket 356.

FIG. 12b illustrates an alternate arrangement for the mounting of movable arms 296a-296d wherein a counterpart movable arm 360 recesses within a fixed arm member 362, a counterpart of a fixed arm 292 of FIGS. 11a and 11b.

FIG. 13 illustrates schematically the relative position of components of log loader 10 and cooperating dogs A of revolver 12. Additionally, it illustrates an alternate arrangement for the operation of a movable arm 296 wherein a hydraulic cylinder 370 is pivotally mounted at point 372 on one of arm members 270a-270d of turner/loader 260, and its piston 374 is pivotally connected to arm 376, which in turn is pivotally connected to a second arm 378, with the two being pivoted at point 380. Second arm 378 is pivotally connected at point 382 to a third arm 384, which in turn is pivotally connected at point 386 to movable arm 296 of one of the front and rear sets of movable arms of turner/loader member 260 (one set being 296a and 296b, and the other set being 296c and 296d). By the extension stroke of hydraulic cylinder 370, arm 296 is caused to rotate clockwise about pivot point 390, at which point the arm is mounted on a fixed arm region 292 of a turner/loader member 270a-270d.

FIG. 4, particularly described above, illustrates an overall control system for manually or automatically controlling the lateral position of revolver 12 with respect to sawing plane F—F in accordance with dimensional characteristics of a log to be sawed, and, for maintaining log turner/loader 260 parallel with the revolver as the revolver is adjustably aligned with bandmill 16. As described above, optical sensors 30a and 30b of scanner assembly 14 provides sets of upper and lower dimensional data for a log at selected and measured points along a log, and from this data, which, as illustrated, is displayed by upper side and lower side readouts 232 and 234 of display 230, and the lateral position of revolver 12 with respect to bandmill 16 is computed.

In accordance with the system shown in FIG. 4, the computation described above with respect to FIG. 7 would be computed by position computer 400, programmed to effect the computations described. Thus, position computer 400 would provide horizontal resultant distance signals $C_1$ and $C_2$. These quantities, in the form of electrical command signals, define the front and rear lateral spacing of sawing band 36 from a front and rear position of revolver 12. Coordinately, distance measurement indicators 102 and 104, coupled to the front and rear points f and r of revolver 12, provide distance measurements or electrical signal outputs $C'_1$ and $C'_2$, indicative of the actual distance between the front and rear ends of the revolver to sawing band 36. The front command signal $C_1$ and front actual position $C'_1$ are fed to comparator 402, and it provides as an output a difference or error signal $e_1$ which is applied to valve control 98, which operates revolver front control valve 82, typically a four-way valve, in a direction to operate revolver front cylinder 80 to expand or retract in a direction which will reduce the signal $e_1$ to zero, at which point the indicated and command distance signals are equal, and thus the revolver front is at the commanded position.

Similarly, rear position indicator 104, coupled to revolver rear point r, provides a position signal $C'_2$ to comparator 404 to which there is also provided the command signal $C_2$. As a result, comparator 404 provides as an output difference or error signal $e_2$ which causes valve control 100 to operate revolver rear control 96 in a manner to cause revolver rear cylinder 90 to extend or retract in a direction to cause indicator 104 to bring the error signal $e_2$ to zero, at which point the indicated and commanded distance signals are equal, and the revolver rear is at its appropriate commanded position.

In the manner described, revolver 12 is brought to the commanded position with respect to bandmill 16 so that sawing band 36 will saw along a plane F—F corresponding to the computed plane M" as described.

FIG. 4a illustrates in some detail the makeup of position computer 400 in terms of mathematical functions to be performed as described above, and reference should again be made to FIG. 7. Accordingly, there would be included an angle Z computer 406 which, responsive to the chosen chord constant CD and upper and lower distance measurements SU and SL, along with values T and W, computes the smallest absolute angle Z available, $Z_2$ as described. With this angle computed and the dimension RP (the distance between reference plane P—P of optical scanner 30 and the center axis R—R of revolver 12), front position computer 408 would solve the equation for $N_1$, the radial distance from mathematically constructed plane M" to the front axis point f of revolver 12. Similarly, with the introduction of a further constant K, the overall distance between reference points f and r where cylinders 80 and 90 effect lateral control of revolver 12, rear position computer 410 would compute the quantity $N_2$, indicative of the desired radial distance between the rear center (point r) of revolver 12 and plane M", which becomes the cutting plane F—F as shown in FIG. 3.

Position computer 400 would further include, as shown in FIG. 4a, computational elements 411 and 412 which would, from the quantities $N_1$ and $N_2$, respectively, determine the lateral or horizontal components, $C_1$ and $C_2$, of the desired spacing of revolver 12 and plane M'' to coincide with plane F—F of sawing band 36. In each instance, computational elements 411 and 412 divide the N input by sine 60°, in accordance with the geometry shown in FIG. 8. With the quantities $C_1$ and $C_2$ determined, these quantities would be fed to comparators 402 and 404, and the front and rear cylinders 80 and 90 would be operated to achieve the positioning of revolver 12 as desired.

In addition to determining the position of line M and the computation of an angle Z for a board length based on a selected width board, as described, computer 400 would typically include circuit means for computing the length of a selected chord based on option data stored in computer 400.

As previously stated, it is desired that log turner/loader 260 be maintained at basically parallel alignment with revolver 12, and means are provided to effect this. It is also important that in the movement of turner/loader 260 to follow that of revolver 12 that the former does not mechanically vibrate or otherwise interfere with the position of revolver 12 with respect to bandmill 16. FIGS. 1 and 4 illustrate a method of accomplishing this. As shown, indicator 420 provides an electrical output representative of the lateral position from a fixed ground reference of the front point LF of log turner/loader 260, and indicator 422 provides an electrical output representative of the vertical position of the rear point LR of log turner/loader 260 with respect to a fixed ground position. Since indicators 420 and 422 provide an indication of the position of the front and rear of revolver 12 from a fixed ground position, means are provided to obtain a relative signal indication of their positions, this being by comparators 424 and 426. Comparator 424 is fed position signals from front indicator 102 (FIG. 2) for revolver 12 and front indicator 420 (FIG. 1) for turner/loader 260, and comparator 426 is fed position signals from rear indicator 104 for revolver 12 and rear indicator 422. By appropriate adjustment of the outputs of the indicators, outputs of comparators 424 and 426 may be adjusted to zero when there is a desired distance between the front and rear ends of the revolver and log turner/loader 260, and accordingly, output signals from comparators 424 and 426 are employable via control valves 430 and 432 to effect operation of log loader front cylinder 280 and log loader rear cylinder 282 to maintain the revolver and log turner/loader parallel, this being readily accomplished via well known technology.

The distance between the axis of the log turner/loader and revolver may also be maintained in a parallel relationship by the employment of control cable assemblies which interconnect between front and rear connections on the revolver to control valves which operate the front and rear cylinders 280 and 282 of turner/loader 260. Such a control valve would simply be of a type which, when operated in a first direction, supplies fluid to a cylinder to expand it; and when operated in the opposite direction, controls fluid flow to the cylinder to retract it. The cable control assembly would be conventional and of a type typically used on lawnmowers wherein there is a flexible outer housing and a flexible wire control cable within the housing.

In this case, as schematically illustrated in FIG. 14, housing 433 enclosing control cable 434 of front cable assembly 436 would be clamped at a revolver end to a fixed point, not laterally movable, on body 435 of front cylinder 80. The corresponding end of cable 434 would then be attached to front rotary coupling 86 of revolver 12 whereby, as the front of the revolver is laterally moved by cylinder 80, as described above, the opposite end of cable 434 would move in and out of housing 433 responsive to movement of revolver 12. At this opposite end, housing 433 would be clamped to the body 437 of front cylinder 280 of turner/loader 260 as would be the case for the body of valve control 438, as shown. Then, cable 434 would move into and out of valve control 438 as a function of movement of the front of revolver 12, whereby valve control 438 would be operated to control fluid flow to turner/loader cylinder 280, thus the movement of the front of turner/loader 260 would be caused to follow that of the front of revolver 12.

In a similar manner, cable control assembly 436a, identical in construction to that of cable control assembly 436, would be coupled between rotary coupling 94 at the rear of revolver 12 and rear turner/loader cylinder 90, and valve control 438a is attached to cylinder 282. Thus, the rear cable assembly and rear valve control 438a would effect a following by the rear of turner/loader 260 to the movement of the rear of revolver 12 as the latter adjusts to effect a selected sawing plane F—F. As a result, parallel alignment of turner/loader 260 with revolver 12 would be maintained.

Figure 15:
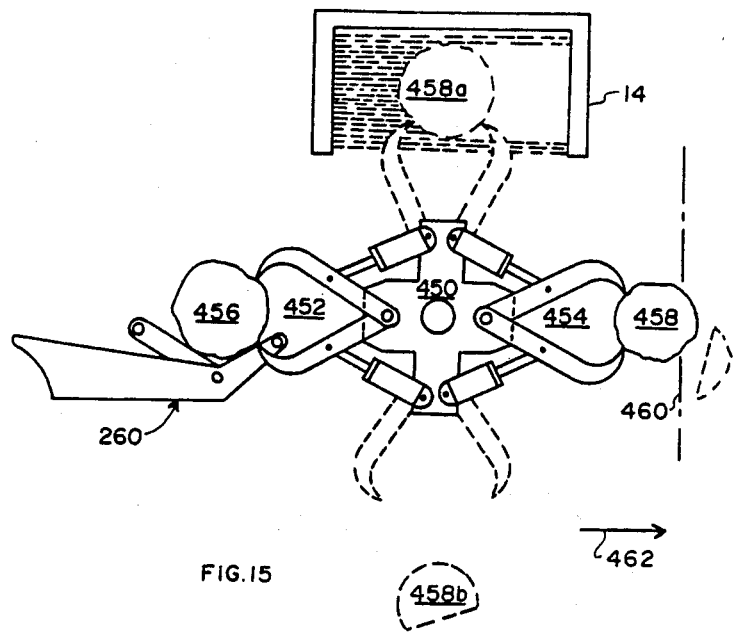
FIG. 15 is a schematic illustration of an alternate configuration of one of the basic subsystems of the invention wherein two logs are handled at a time.

FIG. 15 schematically illustrates a modification of revolver 12 showing a revolver 450 having two operative sides rather than three, and wherein there is a first set of operative dogs 452 on one side and a second set of operative dogs 454 on the opposite side. As shown, one log, log 456, has just been loaded from turner/loader 260 to dog set 452, positioned at a nine o'clock orientation. At the same time, a second log 458 would be sawn. In this case, however, the bandsaw doing the sawing (not shown) would be set to cut along a vertical plane 460, generally parallel to revolver 450. This is in contrast to the 60° angle of sawing plane F—F shown in FIG. 3. Log 458 would have been scanned, prior to sawing, by log scanner assembly 14 in the same manner described above, this having been done after being rotated from a nine o'clock receiving position to the twelve o'clock scanning position, shown as log 458a in dashed lines. Since the cutting plane is vertical, and thus normal to the lateral horizontal plane of relative movement between revolver 450 and the bandsaw, which plane of movement is illustrated by arrow 462, angular resultant distance components $C_1$ and $C_2$ as illustrated in FIG. 3 need not be calculated. Instead, dimensional components $N_1$ and $N_2$, the radial distance between the center of revolver 450 and the cutting plane of the bandsaw, may be used directly to relatively position the revolver with respect to the bandsaw.

After cutting, log 458 would be rotated to the six o'clock release position illustrated by log 458b, during which time log 456 would have been moved to the twelve o'clock position and would undergo scanning.

Figure 16:
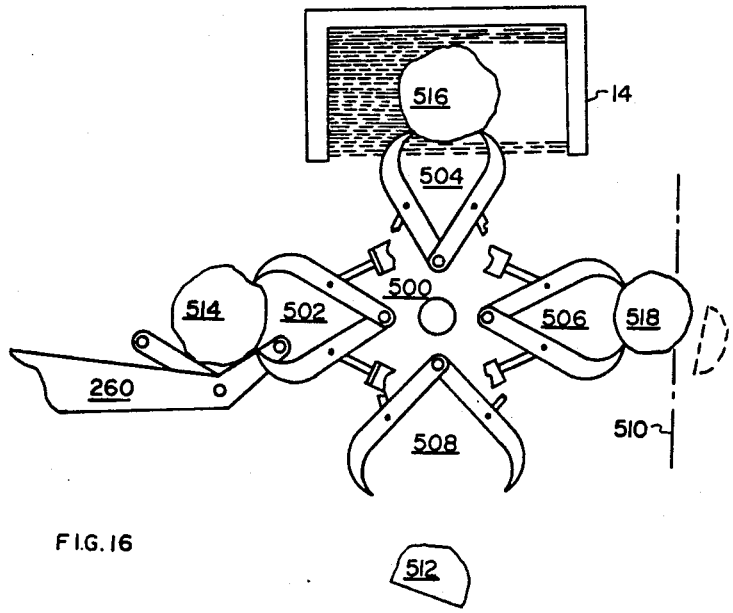
FIG. 16 is a schematic illustration of a further embodiment of the invention wherein the same basic subsystem is adapted to handle four logs at a time.

FIG. 16 illustrates a second alternate of revolver 12, revolver 500, which has four sides, illustrated by the four sets of dogs 502, 504, 506, and 508, being positioned 90° apart. Like the embodiment shown in FIG. 15, the bandsaw would be positioned to cut in the vertical plane 510. However, it would enable the loading of a log at the same time that a log is being scanned and sawn, as in the case of the embodiment of revolver 12. Additionally, however, it would have a fourth position represented by the position of dogs 508, whereby the discharge of a log 512 would be enabled at the same time of the loading, scanning, and sawing of the other logs, logs 514, 516, and 518. Thus, all four such functions may be performed simultaneously, providing increased efficiency in operation.

To briefly review the principal operations which a log is subjected to in the embodiment shown in FIGS. 1 and 2, a plane of light LT from laser light source 320 is directed along a log and is illustrated by a dashed line, it being positioned to intersect tongs of dogs on a side facing turner/loader 260 and indicating where on the log the log will be engaged. An operator would, either by inspection or from data supplied him (for example, from a line G from an optical profile scanner), operate motor 308, by means of control 309, to angularly orient log $L_1$ (FIG. 1) or log LD (FIGS. 10c and 10d) at an angle wherein the end of the log is set such that a desired opening face cut of log $L_1$ would be along a plane which is parallel to the plane of light LT as it appears on the end of log $L_1$ (or log LD in FIG. 10c), lines LT and G being parallel. Then, front and rear arm controls 334 and 336 would be operated to operate cylinders 330 and 333 to coordinately cause the movement of front sets of movable arms 296a and 296b and rear sets 296c and 296d to enable the tongs of dogs of revolver 12 to desirably grasp log $L_1$ (FIG. 1) while maintaining the alignment described. Most significantly, once grabbed, the position and orientation of the log with respect to the axis of revolver 12 is precisely maintained.

Next, by operation of control 68 (FIG. 2), revolver motor 70 would be operated to rotate log $L_1$ about the axis of revolver 12 at the 12 o'clock position illustrated for log $L_2$ (and the position of log LC in FIG. 10c). At this point, the log would be horizontally scanned by optical scanners 30a and 30b (FIGS. 1, 3, and 4) to provide profile signal outputs along the log as scanner 30 is moved from end to end, and wherein, as described with respect to FIGS. 4, and 7, the angle Z required in the determination of skew angle between revolver 12 and bandmill 16 would be determined.

Next, by operation of control 68, revolver motor 70 would be operated and revolver 12 would be rotated clockwise so that log $L_2$, as shown in the 12 o'clock position in FIG. 1, would be moved to the four o'clock position as indicated by log $L_3$ in FIG. 1 (log LB in FIGS. 10b–10d). Then, as described above with respect to FIGS. 3, 4, 8, and 9, revolver 12 would be laterally moved by front and rear cylinders 80 and 90 in accordance with the dimensional outputs $C_1$ and $C_2$, and, respectively, positioning the log, log $L_3$ (FIG. 3) as shown, for cutting by sawing band 36. This event is also illustrated for log LB in FIGS. 10c and 10d. When this occurs, flitch 240 from the log drops onto belt 241 of conveyor 242 and is carried away. Thereafter, control 68 is operated to operate motor 70 to again rotate revolver 12 clockwise, this time through the position shown by dogs C in FIG. 10e, at which point in the rotation the dogs C, holding log LB, are released by operation of four-way valve 126c, whereby log LB, as cut with a selected best operating face 520, is carried away by conveyor belt 245 of conveyor 246, and typically would then be moved to a second saw for breakdown of the log into lumber.

From the foregoing, and as particularly illustrated with respect to FIGS. 10a–10e, it is to be appreciated that during the time that a log LD is at the eight o'clock position and is being loaded onto revolver 12, the log LC at the 12 o'clock position is being scanned, and the log LB at the four o'clock position is being sawn. Then, during the further rotation of revolver 12, when dogs C pass through the six o'clock position, four-way valve 126a is operated to release dogs C, and log LB would be released onto conveyor 246 and be carried away.

While as shown and discussed, profile measurements are made on both sides of a log, it is to be appreciated that one side of the log may be referenced to a line when loaded onto the revolver, and then with the contour of this side assumed to follow this line, only the other side would be measured. From the known relative position of this line to the log and the measured side, the overall contour would be estimately computed.

While the present invention generally contemplates a scanning system for log profile measurements wherein scanning occurs parallel with the plane of adjustment of the revolver, or along a direction of measurement perpendicular to the latter, it is to be appreciated that some modification of this is possible without departing from the scope and spirit of the invention. To persue this, it is to be noted that, fundamentally, profile measurements are made with respect to the position of the axis of the revolver, and preferably as described, this measurement may be made while the revolver is in lateral motion. In accordance with the method described thus far, this is made possible because of the geometry of the system wherein there is no component of the movement dimension in the dimension of measurement. An alternate method would be to mount the profile measurement system on the laterally movable frame of the revolver, or otherwise slave its movement to follow that of the revolver. When this is done, it is no longer necessary that the direction of measurement be with respect to the plane of relative movement between the revolver, and thus the profile measurement system may be positioned at another (than 12 o'clock) point around the revolver.

Further, it is possible that the location of the profile scanner or other measurement device be at a *fixed* site other than as shown and that usable measurements be made along lines other than normal to the plane of revolver-saw relative movement. However, when this is done, there would be imposed the limitation that a measurement be made with respect to one log when revolver-saw adjustment for the preceding log has been completed and not during a revolver-saw adjustment. Thus, typically in such case, a measurement would be made for one log while the other log is being sawn. Subject to this limitation, two possible arrangements are noted. In one, while the basic position of the scanning system would not be laterally movable, it would be mounted on an axis generally parallel with the revolver, and this axis would be rotatable (a few degrees) such that the profile measurement of a log held by the revolver would be along lines parallel with a radial plane through the axis of the revolver. Since the lateral position of the revolver and its rotational position may be accurately ascertained at all times, there would be control data available to automatically control the rotational mounting of the scanning system and to provide distance variations which may occur between the scanning system and axis of the revolver. From these, correct profile measurement should be possible. Second, although the control computations would perhaps be somewhat more complex, the profile scanner might be entirely fixed mounted; and to the extent that its view of scanning is such that its measurements were not directly along lines through or parallel with the axis of the revolver, since offsets are measurable, and could be made instantly available to a computer for the system, it should be possible to obtain precise measurements of a log with respect to the center of the revolver. Of course, once this is done, there can be determined a desired relative position between a revolver and saw, and there would then be effected a selected relative movement between the two to enable selected sawing as described.

In summary, this invention enables the original orientation of a log with respect to the center of revolver 12 to be maintained from the moment that the log is received by it from the turner/loader, through the steps of profile measurement, position adjustment for sawing, and sawing. By making profile measurements in a direction normal to the plane of the position adjustments of the revolver for sawing, such adjustments may be simply effected at the same time that profile measurements are being made without affecting the accuracy of measurement. This makes for a continuous processing of logs by the system wherein, while one log is being sawn, a second log is being measured, and a third log is being loaded to follow the second log. By his invention, the applicant has provided a system which provides both of the basic improvement factors sought in sawing systems, speed and accuracy, without sacrificing either, a goal which it is believed has not been previously met.

While there has been illustrated a scanning system for determining a profile of a log in a plane normal to the radial of the revolver, it is to be appreciated that scanning or profile measurement may be accomplished along lines parallel with such radial. In this manner, additional data useful in the sawing of a log would be provided.

What is claimed is:

1. A log handling and sawing system comprising:
    log rotation and positioning means having an elongated rotational axis for receiving and selectively rotating a log to a selected angular position and spatial position;
    log orientation means comprising:
        an elongated frame positioned parallel with and adjacent to said log rotation means, and means for pivotally supporting said elongated frame about its longitudinal axis,
        revolve drive means for selectively revolving said elongated frame about said longitudinal axis, and
        clamping means supported by said elongated frame for clamping a log along a longitudinal side of said frame;
    clamp control means for separately operating, opening and closing, said clamping means;
    log loading means for loading logs, one at a time, on said log rotation and positioning means;
    saw and motive means supported adjacent a side of said log orientation means for making a longitudinal cut from a log when the log has been rotated by said log orientation means;
    profile detection means for providing an output indicative of a profile of a log held by said clamping means; and
    control means for relatively positioning said log orientation means and said saw and motive means, whereby a selected cut may be made longitudinally through a said log.

2. A system as set forth in claim 1 wherein said clamping means includes a plurality of sets of clamps supported by said elongated frame, each set comprising a plurality of spaced pairs of said clamps positioned to engage a log along a longitudinal side of said frame, and said sets being angularly spaced about said elongated frame.

3. A system as set forth in claim 1 including a first conveyor positioned to receive an outer cut region of a log upon the cutting of the log by said saw and motive means, and a second conveyor positioned below said log orientation means and positioned to receive the balance of said last-named log.

4. A system as set forth in claim 1 wherein said log rotaton and positioning means comprises:
    a plurality of parallel, spaced, first arm members;
    a first driven drag chain having a log entrance end and log exit end supported by and along a portion of each said first arm member, and said exit end being adjacent to said log orientation means;
    a second arm member pivotally attached to each said first arm member adjacent to said entrance end of said first drag chain;
    a second drag chain supported by and along each second arm member and having a log entrance end for receiving logs, and an exit end adjacent to said entrance end of said first drag chain;
    chain drive means for selectively providing drive to said first and second drag chains; and
    arm rotation means for selectively pivoting said second arm members about said first arm members;
    whereby, first, the loading of a log onto said rotation and positioning means is enabled by pivoting said second arm members, then, by said drag chains, it is rotated to a selected angular position, and finally, by pivoting said second arm members, the log is selectively positioned for engagement by said clamps.

5. A system as set forth in claim 4 wherein said log loading means includes positioning means for longitudinally aligning logs with respect to said log rotation and positioning means.

6. A system as set forth in claim 5 wherein said log loading means includes a drag chain for longitudinally aligning a log with said rotation and positioning means.

* * * * *